(12) United States Patent
Sonnendorfer et al.

(10) Patent No.: US 9,016,444 B2
(45) Date of Patent: Apr. 28, 2015

(54) IMMOBILIZER FOR A TRANSPORT TROLLEY

(76) Inventors: Horst Sonnendorfer, Puchheim (DE); Franz Wieth, Puchheim (DE)

( * ) Notice: Subject to any disclaimer, the term of this patent is extended or adjusted under 35 U.S.C. 154(b) by 2302 days.

(21) Appl. No.: 11/816,649

(22) PCT Filed: Feb. 17, 2006

(86) PCT No.: PCT/DE2006/000299
§ 371 (c)(1),
(2), (4) Date: Aug. 29, 2007

(87) PCT Pub. No.: WO2006/086975
PCT Pub. Date: Aug. 24, 2006

(65) Prior Publication Data
US 2008/0143498 A1    Jun. 19, 2008

(30) Foreign Application Priority Data

| Feb. 18, 2005 | (DE) | 20 2005 002 710 U |
| Feb. 18, 2005 | (DE) | 20 2005 002 711 U |
| Feb. 18, 2005 | (DE) | 20 2005 002 713 U |
| Feb. 18, 2005 | (DE) | 20 2005 002 714 U |
| Sep. 26, 2005 | (DE) | 20 2005 015 212 U |
| Oct. 5, 2005  | (DE) | 20 2005 015 689 U |

(51) Int. Cl.
*B60T 7/18* (2006.01)
*B60B 33/00* (2006.01)
*B60B 33/02* (2006.01)
*B62B 5/04* (2006.01)

(52) U.S. Cl.
CPC ........... *B62B 5/0423* (2013.01); *B60B 33/0028* (2013.01); *B60B 33/0049* (2013.01); *B60B 33/0057* (2013.01); *B60B 33/0068* (2013.01); *B60B 33/0092* (2013.01); *B60B 33/025* (2013.01); *B60B 33/026* (2013.01)

(58) Field of Classification Search
USPC ............... 188/111, 69, 19, 1.12; 280/33.994
See application file for complete search history.

(56) References Cited

U.S. PATENT DOCUMENTS

| 2,964,140 | A | * | 12/1960 | Berezny  | 188/111 |
| 3,031,037 | A | * |  4/1962 | Stollman | 188/111 |
| 3,117,655 | A | * |  1/1964 | Skupas et al. | 188/111 |
| 3,495,688 | A | * |  2/1970 | Isaacks | 188/31 |
| 4,577,880 | A | * |  3/1986 | Bianco | 280/33.994 |

FOREIGN PATENT DOCUMENTS

GB    2384175 A  *  7/2003  ............. B60B 33/00

* cited by examiner

*Primary Examiner* — Xuan Lan Nguyen
(74) *Attorney, Agent, or Firm* — Laurence A. Greenberg; Werner H. Stemer; Ralph E. Locher

(57) ABSTRACT

The invention relates to an immobilizer for a transport trolley, whereby a magnetic field is used for alternately activating and deactivating said immobilizer. In an embodiment of the invention, the deactivating magnetic field can be weaker than the activating magnetic field.

4 Claims, 6 Drawing Sheets

IMMOBILIZER FOR A TRANSPORT TROLLEY

TECHNICAL FIELD

The invention relates to a transport trolley with steerable rollers. Transport trolleys such as these are made available by shopping centers to customers for use within a permissible area.

PRIOR ART

So-called immobilizers are used in order to prevent the possibility of a transport trolley also being used outside this area. In known immobilizers, the immobilizer is activated by magnetic forces.

A magnetic zone is located close to the ground at the boundary of the permissible area. On moving over the magnetic zone, magnetic forces operate a mechanism which then in the end activates the immobilizer.

Known immobilizers must be deactivated again by means of specific tools and/or apparatuses.

DISCLOSURE OF THE INVENTION

Technical Object

The object of the invention is to make the alternate activation and deactivation again of the immobilizer simple, reliable and cost-effective, without any specific tools and/or apparatuses being required.

Technical Solution

The solution according to the invention provides that
  deactivation is carried out again by the same mechanism as that used for activation as well,
  the immobilizer is activated and deactivated by moving over a magnetic zone and
  the movement sequences of the mechanism for activation and deactivation are essentially the same.

Once the immobilizer mechanism has been initiated by a temporarily acting magnetic field, it remains permanently in the activated state, that is to say the state which prevents the transport trolley from being moved away, until a renewed temporarily occurring magnetic field starts a new movement sequence and the mechanism is then switched to the deactivated state, allowing free movement of the transport trolley again.

It has been found that, when customers return a shopping trolley—which has been located outside the permissible area and whose immobilizer has therefore been activated—back into the permissible area, they often raise the shopping trolley on one side. In consequence, the forces which originate from the magnetic zone act on the immobilizer only to a reduced extent.

In one development of the invention, the mechanism is therefore designed such that a weaker magnetic field is sufficient to deactivate the immobilizer than for activation.

Advantageous Effects

The solution according to the invention means that essentially the same mechanical components can be used for activation and deactivation, and the number of components used can advantageously be kept small, and the fact that the deactivation takes place by weaker magnetic fields than those for activation advantageously ensures that the immobilizer on the transport trolleys which are moved back into the permissible area with the immobilizer activated is reliably deactivated again, even if the shopping trolley is raised on one side.

BRIEF DESCRIPTION OF THE DRAWINGS

The invention will be explained in more detail in the following text with reference to 6 figures.

Figure 1:
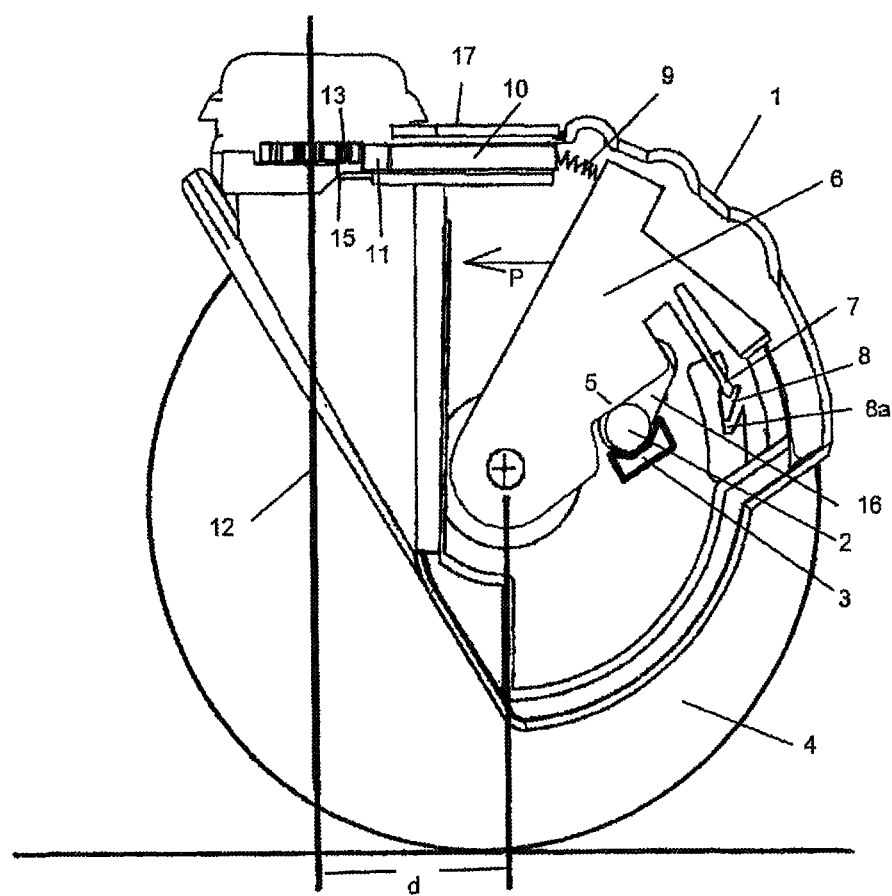
FIG. 1 shows an immobilizer 1 in the activated state.

A movement, which is not illustrated here and has been caused by magnetic forces, of a lever which cannot be seen in this illustration has allowed the ball 2 to roll from an initial position to the position shown here.

A driver 3, which is coupled to the rolling wheel 4, has forced the ball 2 onto an edge 5 of the rocker 6, and has moved this rocker 6 in the direction of the arrow P.

A holding tab 7 of the rocker 6 is latched in a catch 8, and holds the rocker 6 in the illustrated position.

The movement of the rocker 6 has led to the spring 9 having been compressed, and to a carriage 10 having been moved. A tooth system 11 is provided on its side opposite the spring 9 and now engages with a tooth system 13 arranged concentrically around the steering shaft 12.

The tooth systems 11 and 13 are designed such that the tooth system allows the steering angle to be changed in only one direction, and even this only until an end stop 15 comes into contact with the carriage 10.

From this time, the steering angle is fixed in an angled position.

The tooth systems 11 and 13 interact like a catch and, as the steering angle is increasingly changed, the carriage 10 is pushed somewhat back in the direction of the spring 9 in order then to latch again in the next tooth element in the direction of the tooth system 13.

A lever is formed by virtue of the distance d between the steering shaft and the surface on which the wheel 4 is standing. The force required for the catch movement described above is produced if the steering angle likewise changes as a result of a deliberate or non-deliberate change in the direction of the transport trolley.

Once the ball 2 has moved the rocker 6 to the illustrated position, it is moved by the driver 3 through the channel 16 back to the initial position.

The ball 2 then remains in this initial position until the lever mentioned above has once again been moved by magnetically caused forces and it is thus possible for the ball 2 to roll back to the position in which it can be gripped by the driver 3.

As soon as the ball 2 is gripped by the driver 3 that is coupled to the wheel 4, it once again presses against the edge 5 of the rocker 6, moving the latter in the direction of the arrow P.

The holding tab 7 in consequence snaps out of the catch 8. The ball 2 is moved back to the initial position, through the channel again.

The configuration of the holding tab 7 and catch 8 is chosen such that the rocker 6 now pivots in the opposite direction to that of the arrow P until the holding tab 7 is held in a catch 8a.

This pivoting also results in the carriage 10 being pulled back, and the tooth systems 11 and 13 are no longer engaged with one another. The wheel 4 is once again free to rotate about the steering shaft 12, and the immobilizer is deactivated.

A viewing window is located in the housing of the immobilizer 1. It is possible to see through this viewing window whether the carriage is in a position in which the tooth systems 11 and 13 are engaged with one another.

Figure 2:
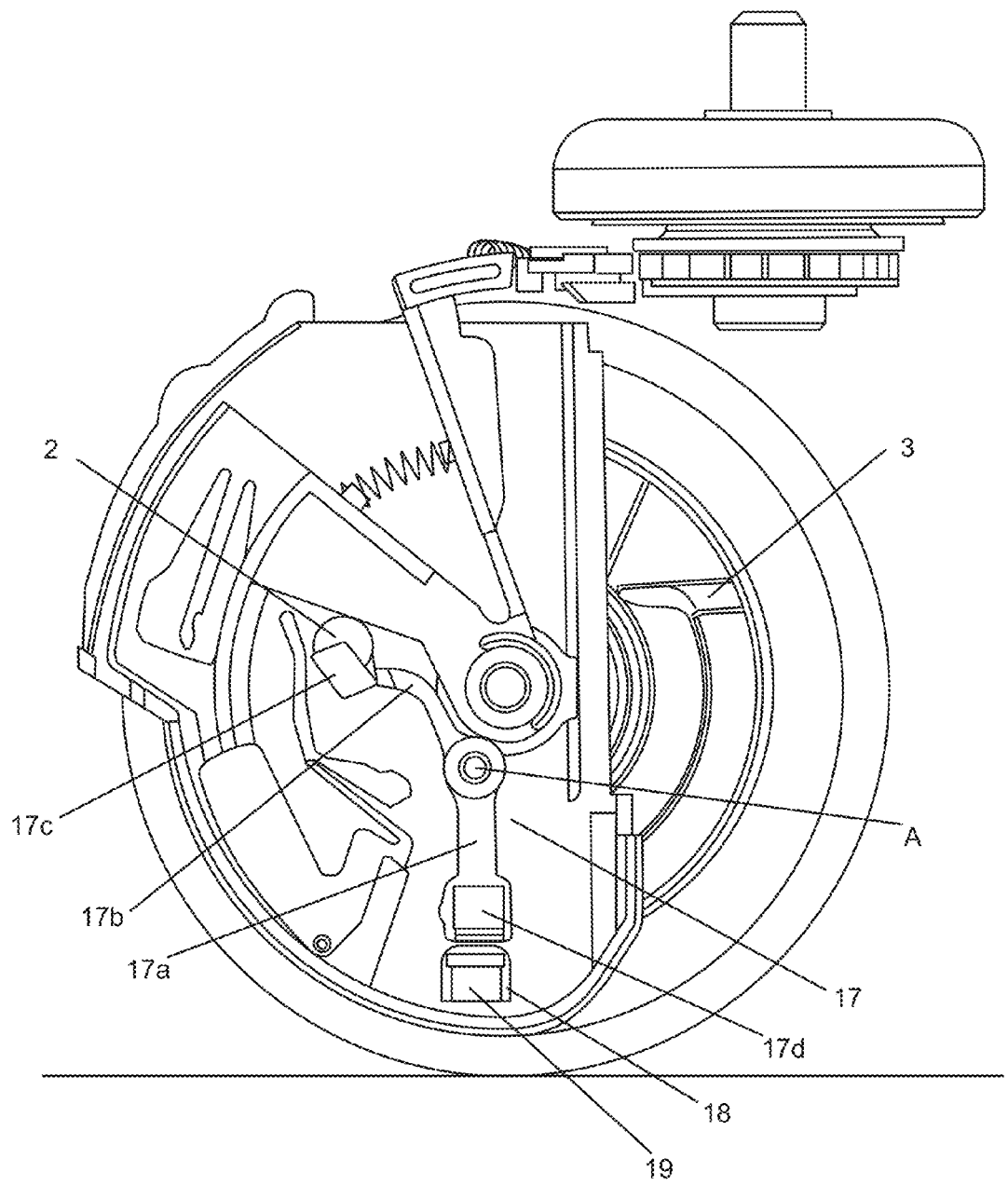

FIG. 2 shows the immobilizer known from FIG. 1, from the opposite side.

The lever 17 which can be moved by magnetic forces can be seen clearly in this view. The lever 17 can rotate about a shaft A and has lever arms 17a and 17b. A block 17c is located at the end of the lever arm 17b and prevents the ball 2 from rolling into the channel 16. An iron part 17d is located at the end of the lever arm 17a.

A further lever 18 is operatively connected to the lever 17 via a tooth system that is not shown. In this view, the lever 18 is located mainly behind the lever 17 and just one magnet 19, which is fitted to the end of the lever 18, can be seen.

Figure 3:
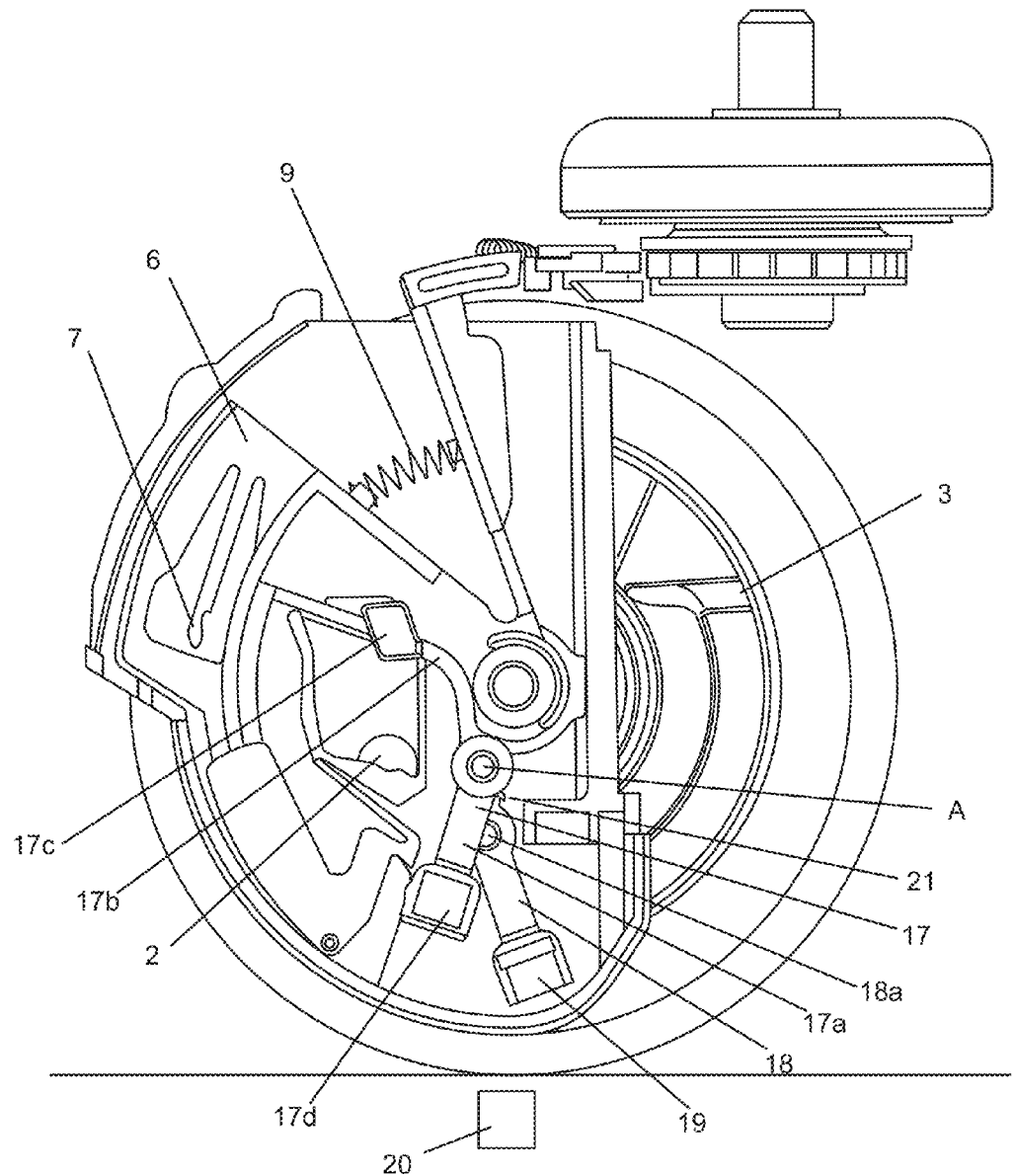

FIG. 3 shows the immobilizer when it is located in the area of influence of a magnet 20 that has been incorporated in the roadway.

The magnet 20 exerts a force on the magnet 19, leading to the lever 18 rotating about the shaft 18a. The lever 17 is likewise pivoted via the tooth system 21. The block 17c releases the ball 2, which then rolls into the channel 16.

When the wheel rotates further, the rocker 6 is moved by the ball 2 and by the driver 3, as has already been described in detail with reference to FIG. 1.

Figure 4:
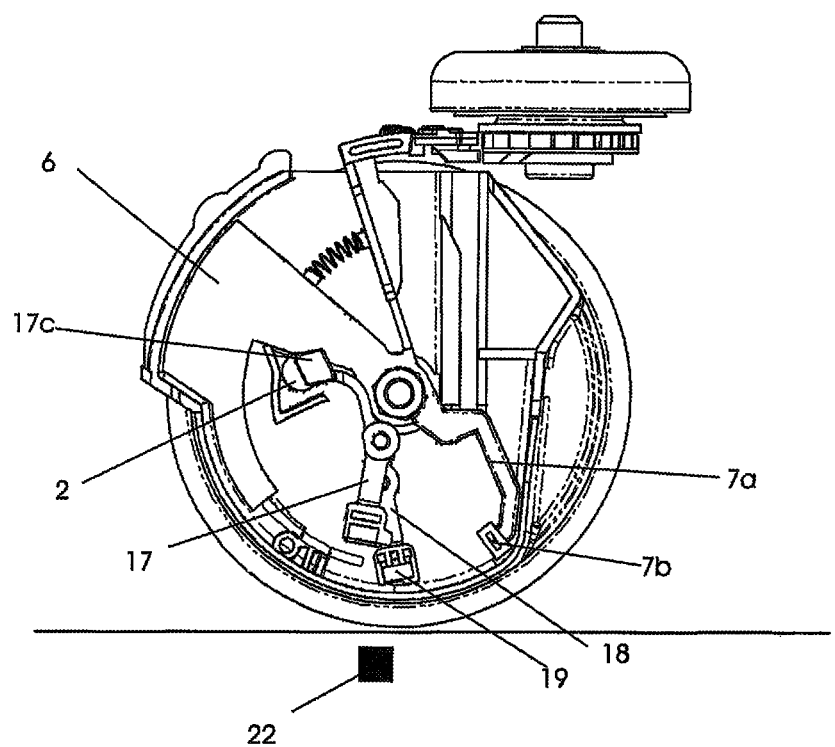

FIG. 4 shows a development of the invention. The immobilizer is in the deactivated state and has just entered the area of influence of the magnet 22. A lever 7a, to whose end a magnet 7b is attached, is located on the rocker 6.

The magnet 22 has a weaker magnetic field than the magnet 20 that is known from FIG. 3. The force of the weaker magnet 22 produces only a minor effect on the magnet 19 and therefore only a slight deflection of the levers 17 and 18, so that the block 17c therefore does not release the ball 2.

The magnet 7b is sufficiently far away from the magnet 19 that no forces are created which would result in greater pivoting of the levers 17 and 18.

When the immobilizer passes the magnet 22, the state of the immobilizer does not change.

Figure 5:
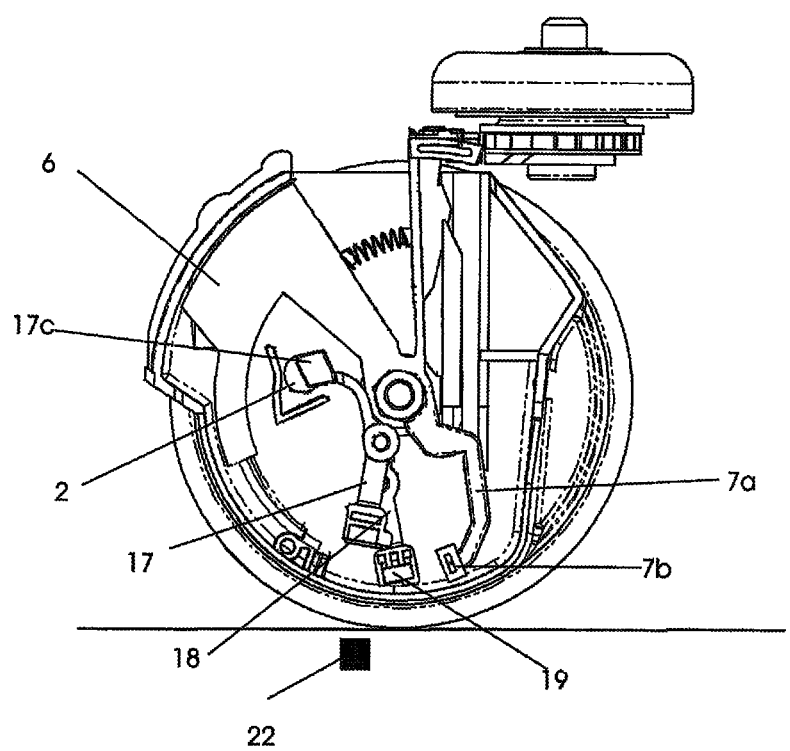
Figure 6:
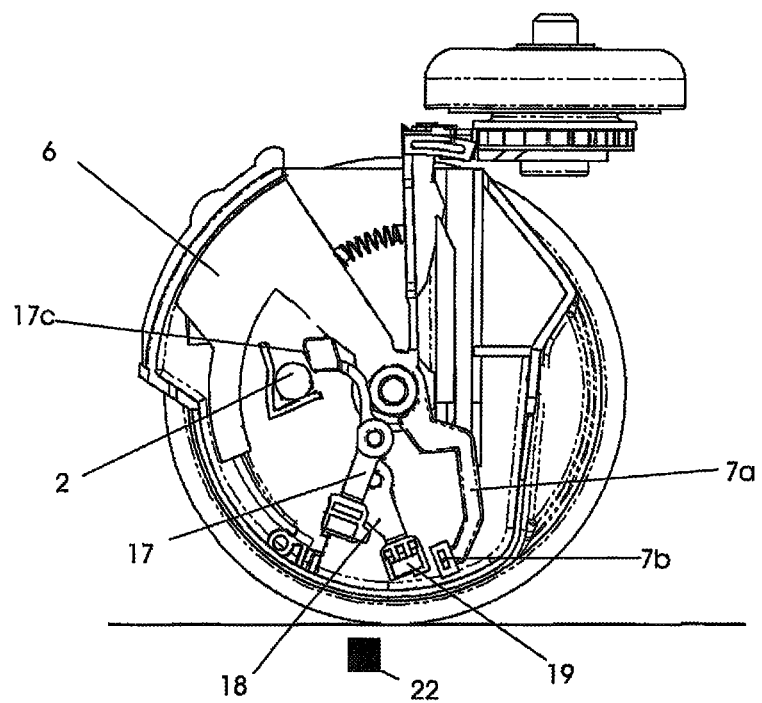

FIGS. 5 and 6 show the development of the immobilizer known from FIG. 4, in the activated state.

When the immobilizer is in the activated state, the magnet 7b is located at a different position within the immobilizer.

The magnet 22 once again produces only a slight deflection of the levers 17 and 18, but the magnet 7b is sufficiently close to the magnet 19 that the magnet 19 is moved further.

This results in the levers 17 and 18 being deflected to such a major extent that the block 17c releases the ball 2.

The characteristic of the immobilizer according to the invention of being able to react to relatively weak magnetic fields selectively with deactivation can be advantageously utilized in various ways.

For example, it is possible to fit magnetic zones of low intensity within the permissible area, which are used to deactivate an immobilizer which is activated, as they are moved over.

It is advantageous, for example, to arrange a magnetic zone of low intensity such as this in the area in which shopping trolleys are collected, in order to ensure that all of the shopping trolleys which have been removed from the collection point pass this zone and that any immobilizer which may still be activated is therefore deactivated.

If a weakly magnetic zone such as this is located within the permissible area but relatively close to the zone with a strong magnetic field which marks the boundary to the impermissible area, then this weak zone can be used to even more reliably deactivate the immobilizers on those transport trolleys which have been moved out of the impermissible area back into the permissible area:

In principle, the strongly magnetic zone deactivates all the activated immobilizers. However, if one of the immobilizers has still not been deactivated for any reason whatsoever after passing through the strongly magnetic zone, then it is deactivated on moving over the weakly magnetic zone.

Since an activated immobilizer can be deactivated by a weaker magnetic field, the immobilizer is often also deactivated when a shopping trolley which has been brought back from the outside with one side raised passes the boundary to the permissible area, and therefore the zone with the strong magnetic field.

The invention claimed is:

1. An immobilizer assembly switchable between an activated state and a deactivated state, comprising:
   an immobilizer having interior operating elements switchable by a magnetic force from an external magnetic field, said interior operating elements selectively switching said immobilizer between the activated state and the deactivated state when the immobilizer assembly is moved through the external magnetic field and the operating elements are moved by the external magnetic field for switching the immobilizer between the activated state and the deactivated state, said interior operating elements selectively switching said immobilizer between the deactivated state and the activated state when the immobilizer assembly is moved through the external magnetic field and the operating elements are moved by the external magnetic field for switching the immobilizer between the deactivated state and the activated state.

2. The immobilizer assembly according to claim 1, further comprising:
   movable initiation elements being moved to an initiation position by the magnetic force of the external magnetic field;
   mechanical operating elements for interacting with the initiation elements;
   activation and deactivation of the immobilizer being carried out alternately said mechanical operating elements;
   said initiation elements and said mechanical operating elements having substantially common movement sequences for activation and deactivation of said immobilizer;
   a holding mechanism for switching to the activated state by said operating elements and remaining in a first position in the activated state, said holding mechanism being deactivated by said operating elements after said operating elements are operated again, and said holding mechanism remaining in a second position in the deactivated state until said operating elements are operated again.

3. The immobilizer assembly according to claim 2, wherein said immobilizer contains a magnet which, when the immobilizer is activated, assumes a position in which a magnetic field of said magnet acts on the initiation elements, and the magnetic field of said magnet assists the external magnetic field to move said initiation elements into the initiation position.

4. The immobilizer assembly according to claim 1, wherein said immobilizer is constructed to have a second external magnetic field which is less than the external magnetic field required for activation is sufficient to switch said immobilizer to the deactivated state from the activated state.

* * * * *